(12) United States Patent
Nakayama

(10) Patent No.: US 8,112,097 B2
(45) Date of Patent: Feb. 7, 2012

(54) BASE STATION

(75) Inventor: Shusuke Nakayama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 288 days.

(21) Appl. No.: 12/429,799

(22) Filed: Apr. 24, 2009

(65) Prior Publication Data

US 2009/0270132 A1 Oct. 29, 2009

(30) Foreign Application Priority Data

Apr. 24, 2008 (JP) .................................. 2008-114529

(51) Int. Cl.
*H04W 24/00* (2009.01)
(52) U.S. Cl. ...................... 455/456.1; 455/572; 455/573; 455/574; 370/338
(58) Field of Classification Search ............... 455/456.1, 455/572–574; 370/338
See application file for complete search history.

(56) References Cited

U.S. PATENT DOCUMENTS

| | | | | |
|---|---|---|---|---|
| 7,792,066 B2 * | 9/2010 | Fujii et al. | ...................... | 370/311 |
| 2008/0051101 A1 * | 2/2008 | Ha et al. | ...................... | 455/456.1 |
| 2010/0279698 A1 * | 11/2010 | Wong | ............................ | 455/450 |

FOREIGN PATENT DOCUMENTS

| | | | | |
|---|---|---|---|---|
| JP | 05-233551 | | 9/1993 | |
| JP | 11-308164 | * | 11/1999 | ..................... 455/574 |
| JP | 11-331059 | | 11/1999 | |
| JP | 2000-514611 | | 10/2000 | |
| WO | WO 2006/001684 A1 | * | 1/2006 | ..................... 455/573 |

OTHER PUBLICATIONS

Office Action from Japanese Patent Application No. 2008-114529, mailed on Apr. 20, 2010, 2 pages.

\* cited by examiner

*Primary Examiner* — Dwayne Bost
*Assistant Examiner* — Inder Mehra
(74) *Attorney, Agent, or Firm* — Morrison & Foerster LLP

(57) ABSTRACT

A base station FLC powered by a commercial power source includes a registration unit 122 for registering information of at least one mobile station using the base station, a battery 160 for supplying power to the base station, a power control unit 150 capable of switching a power supply for the base station from the commercial power source to the battery, and a transmission unit 110, 140 for transmitting a message to a mobile station registered at the registration unit when the power supply for the base station is switched from the commercial power source to the battery by the power control unit.

4 Claims, 4 Drawing Sheets

BASE STATION

CROSS REFERENCE TO RELATED APPLICATION

This application claims priority to and the benefit of Japanese Patent Application No. 2008-114529 filed on Apr. 24, 2008, the entire content of which is incorporated herein by reference.

TECHNICAL FIELD

The present invention relates to a base station of a mobile communication system, more specifically, to a base station having a battery.

BACKGROUND ART

Recently, an apparatus for mobile communication, especially a cellular phone has rapidly come into wide use, and most of areas with a certain population are covered. However, there are some areas where radio waves from a general existing base station (i.e., wide-area base station) cannot reach, which makes the area out of service, and where the radio waves is weak, which brings a communication into unstable, such as the interior space of a house or a building, or a place in an unfavorable situation. A small base station having low output power and providing a cell (service area) with a radius of from several meters to several tens of meters has been developed to cover such areas out of service (see http://www.nttdocomo.co.jp/info/news_release/page/070710_01.html). This small-scale cell itself, or a small base station providing the cell is called as a femtocell. Though the femtocell is very small, it is in the range of a base station, so that the femtocell is not placed on the market in Japan because there are restrictions of various related regulations about notification of installation place, permission, operation time and the like.

On the other hand, since an always-on connection of a broadband line such as an optical line, ADSL or the like has been spread in the usual home, an infrastructure (i.e., backbone) for connecting the femtocell to a mobile communication system is being developed. Moreover, there is also a merit that a telecommunication provider can provide communication service without using a bandwidth of the general existing base station which is supposed to be used by utilizing the femtocell and the broadband line. Accordingly, it is expected that the femtocell will be developed and used on a full scale in the near future by restrictions of related regulations being relaxed or the applications being changed.

DISCLOSURE OF THE INVENTION

Problems to be Solved by the Invention

It is concerned that various problems may occur when a personal user buys such a femtocell (a small base station) and installs it in a house, a small office or the like. Especially, electric power supply may be unstable in a usual house or a small office. Unexpected situations of power supply (i.e., stable securement of electric-power) are easy to occur in a house or a small office, such as removing a plug carelessly by catching the plug on a leg or the like, pulling out a plug consciously for saving power, a power failure caused by lightning, power supply cut-off caused by excessive use of the power (a breaker operates) or the like.

A general public base station is monitored to deal with a problem caused to the power supply and can be recovered rapidly by dispatching a person who can repair the station. However, it is difficult to provide such a maintenance system to a small base station such as femtocell in terms of the cost.

In order to deal with unexpected situations described above, it is conceivable to mount a preliminary battery (battery) on the femtocell, but a user may not recognize that the femtocell is powered by a battery. It is also concerned that if a user continues a communication through the femtocell being powered by a battery, so that battery power is used up, a call is suddenly cut off, or communication is performed through not the femtocell but through a general public base station contrary to his intention.

Moreover, the femtocell base station uses considerable power since a reception unit and a transmission unit operate always to register locations of mobile stations within the coverage area. However, the conventional public base station is not supposed to have a battery, so that a method for saving power when a base station is powered by a battery is not considered.

It is an advantage of the present invention to provide a technique (a base station) for securing stable power supply in using a small base station.

SUMMARY OF THE INVENTION

To solve the problem, according to a first aspect of the present invention, a base station powered by a commercial power source includes:

a registration unit for registering information of at least one mobile station using the base station;

a battery for supplying power to the base station;

a power control unit capable of switching a power supply for the base station from the commercial power source to the battery; and a transmission unit for, when the power supply for the base station is switched from the commercial power source to the battery by the power control unit, transmitting a message about switching the power supply to a mobile station registered at the registration unit.

According to a second aspect of the present invention, a base station powered by a commercial power source includes:

a battery for supplying power to the base station;

a power control unit capable of switching a power supply for the base station from the commercial power source to the battery; and a transmission unit for, when the power supply for the base station is switched from the commercial power source to the battery by the power control unit, transmitting a message about switching the power supply to a mobile station whose location is registered at the base station.

According to the third aspect of the present invention, the base station further includes a control unit for setting a power saving mode when the power supply for the base station is switched from the commercial power source to the battery by the power control unit.

In the above description, the means for solving the problem according to the present invention has been discussed as apparatus. However, the present invention can also be implemented as a method, a program, and a recording medium for storing the program substantially corresponding to those. Therefore it will be understood that such modification and variations are considered to be within the scope of the invention. Moreover, a method or each step of program described below may use, if necessary, a data processing device such as CPU, DSP or the like to process data, and stores inputted data or processed/generated data or the like into a storage unit such as HDD, memory or the like.

According to the present invention, it is possible to secure stable power supply in using a small base station.

BRIEF DESCRIPTION OF DRAWINGS

Preferred embodiments of the present invention will now be described with reference to the accompanying drawings in which.

REFERENCE SYMBOLS

Figure 1:
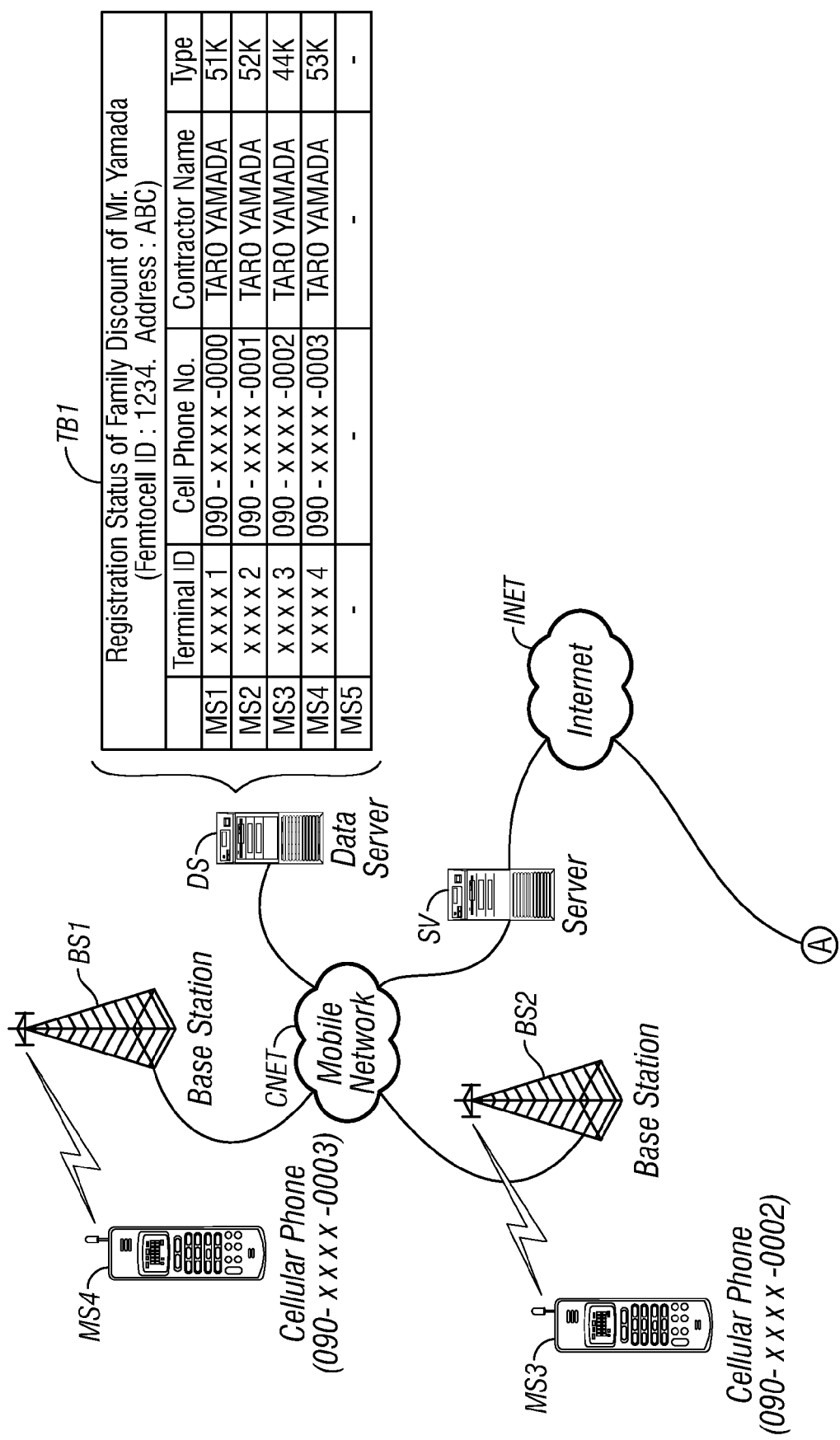
FIG. 1 shows an entire network architecture employing a femtocell (small base station) according to an embodiment of the present invention.
Figure 1:
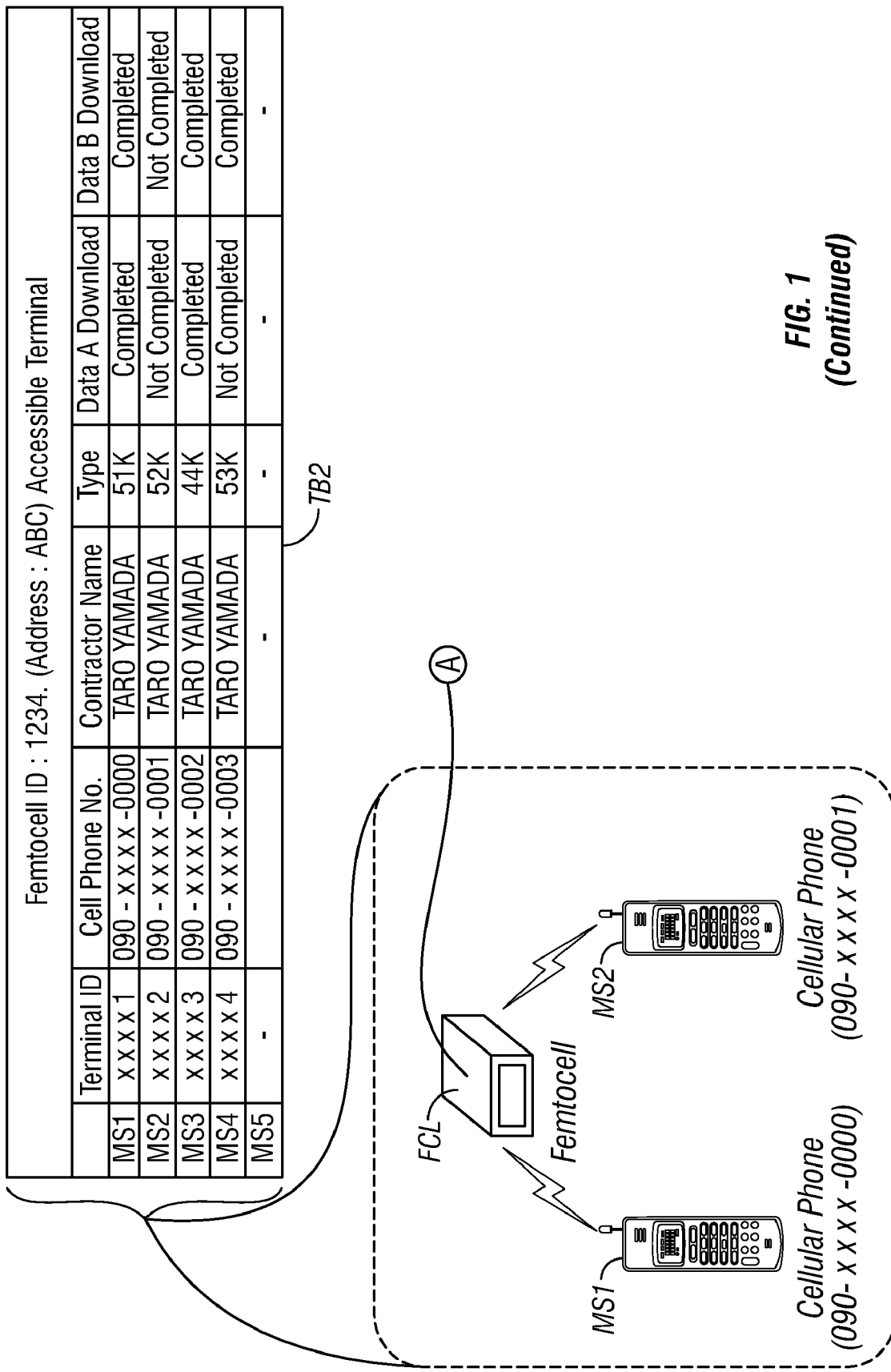

BS1, BS2 base station
MS1, MS2, MS3, MS4 cellular phone
CNET mobile network
INET Internet
SV server
DS data server
TB1, TB2 table
FCL femtocell
110 radio unit
120 femtocell control unit
122 registration unit
124 acquisition unit
126 access control unit
130 storage unit
140 line connection unit
150 power control unit
160 battery
170 voltage detection unit
200 Internet
ANT antenna

DESCRIPTION OF EMBODIMENTS

FIG. 1 shows an entire network architecture employing a femtocell (small base station) according to an embodiment of the present invention. As shown in the drawing, for example, the femtocell FCL is connected to a mobile network CNET through the Internet INET and a server SV for authenticating access to a mobile network via a broadband line such as ADSL (Asymmetric Digital Subscriber Line) and optical fiber or the like installed in general homes. Existing base stations BS1, BS2 and a data server DS which stores a registration status of a group service (family discount) are connected to the mobile network CNET, and when user information is changed, a table TB 1 including data in the data server DS is changed. And, cellular phones MS3, MS4 are respectively connected by radio to the existing base stations BS2, BS1. Mobile phones (mobile stations) MS1, MS2 located within an area covered by the femtocell FCL are connected to the femtocell FCL by radio.

Figure 2:
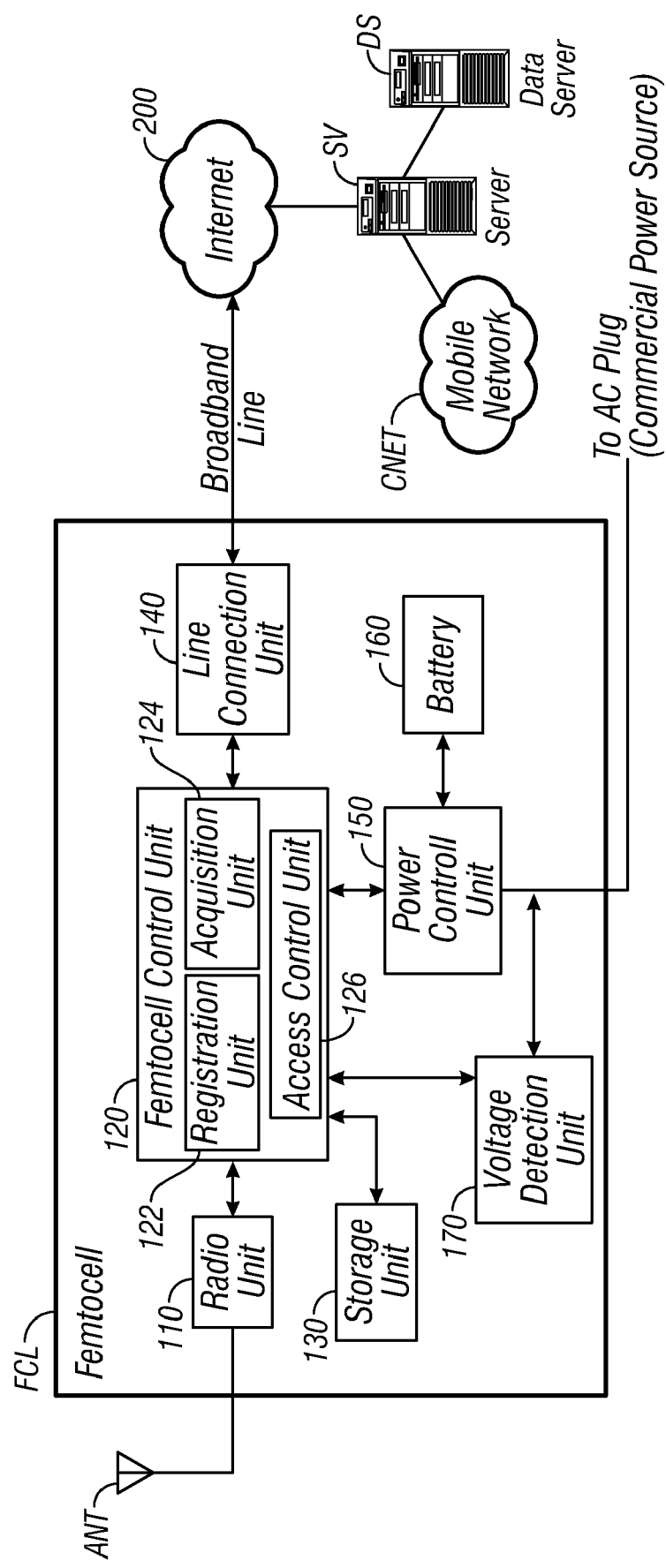
FIG. 2 is a block diagram of the femtocell shown in FIG. 1.

FIG. 2 is a block diagram of the femtocell shown in FIG. 1. As shown, the femtocell FCL has a radio unit 110 for communicating with a cellular phone (mobile station), a femtocell control unit 120 for controlling the femtocell as a whole, a storage unit 130 for storing various setting information, a line connection unit 140 for connecting a broadband line in order to access the Internet 200 or the like, a power control unit 150, a battery (a unit for storing electricity) 160 charged by power supplied from an AC plug (commercial power source) and for providing power to the femtocell when power cannot be supplied from an AC plug (a commercial power source), a voltage detection unit 170 for detecting a voltage applied from the AC plug (a commercial power source), and an antenna ANT for transmitting and receiving radio waves to/from a cellular phone (a mobile station).

The femtocell control unit 120 has a registration unit 122 for registering user information of at least one mobile station using the femtocell FCL, an acquisition unit 124 for acquiring service contract information of a mobile station (cellular phone) for which a user makes a contract with a service provider of the mobile communication system, from a server of the service provider or a mobile station which requests a location registration, based on user information registered at the registration unit 122, and an access control unit 126 for controlling radio access of a mobile station to the femtocell FCL based on the service contract information (a phone number from the mobile station, an identification number of the mobile station or the like). Specifically, the access control unit 126 permits access for registration to only mobile stations corresponding to the service contract information acquired by the acquisition unit 124.

The registration unit 122 registers user information (cellular phone number, identification information such as terminal (mobile station) ID or the like) of at least one mobile station using the femtocell FCL by radio or through broadband line, and stores the information in the storage unit 130.

Figure 3:
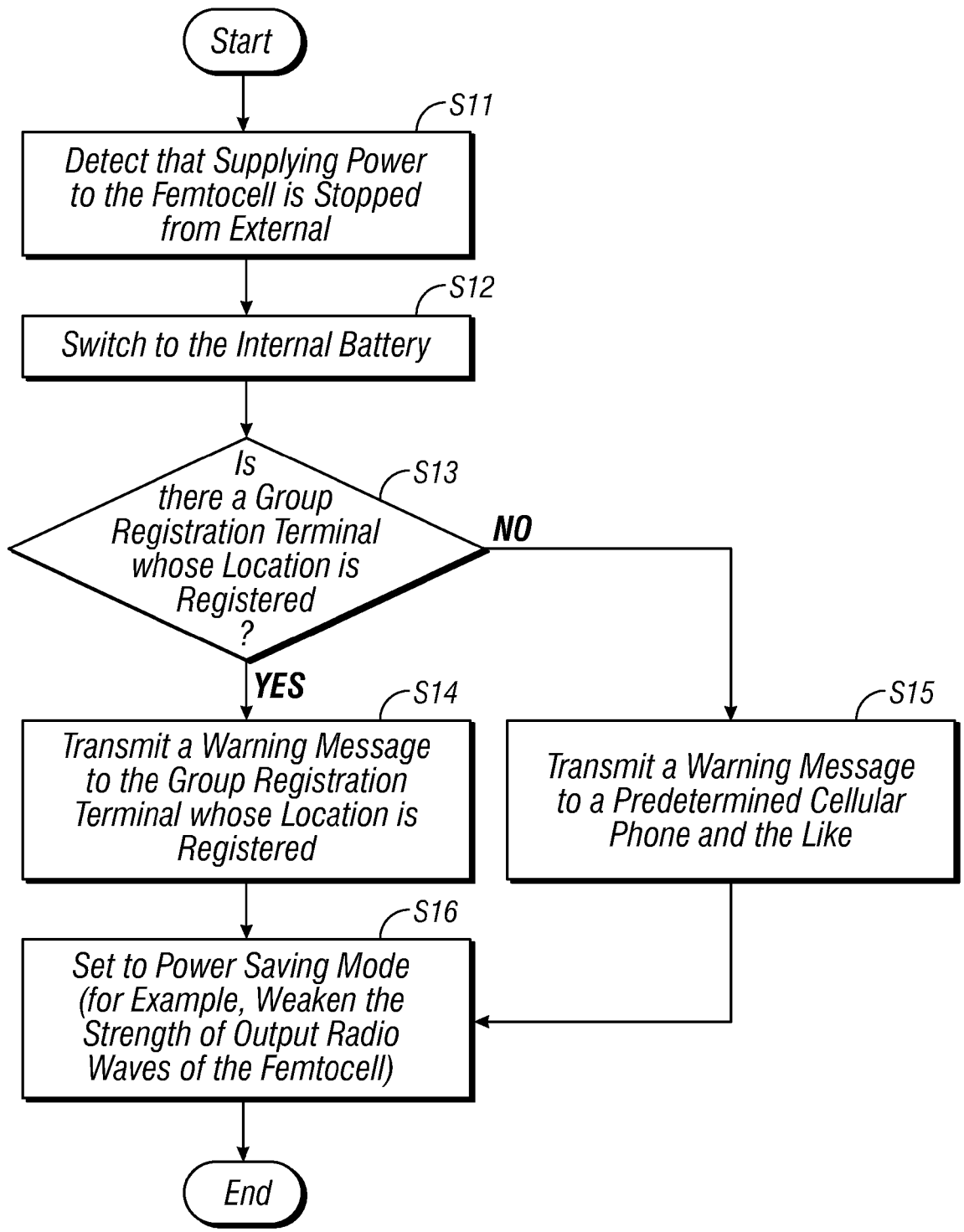
FIG. 3 is a flow chart illustrating a process of the femtocell shown in FIG. 2.

FIG. 3 is a flow chart illustrating a process of the femtocell shown in FIG. 2. First, the femtocell FCL is supplied with power from a commercial power source through an AC plug, and operates as usual. As shown, at step S11, the power detection unit 170 detects that supplying power to the femtocell FCL is stopped from the external commercial power source by measuring voltage. For example, when a breaker at home operates or an AC plug is pulled out with a mistake, supplying power to the femtocell FCL is stopped from the external commercial power source. At step S12, when the voltage detection unit 170 detects that supplying power to the femtocell FCL is stopped from the commercial power source, the power control unit 150 switches a power supply for the femtocell FCL from the commercial power source to the battery 160 mounted on the femtocell FCL.

Next, at step S13, it is determined that there is a group registration terminal (terminal (mobile station) registered at the registration unit 122 as a terminal (mobile station) to which service is permitted to provide. Since a plurality of terminals (mobile stations) can be registered, a set thereof is defined as a group here) whose location is registered at the femtocell. At step S13, when there is a group registration terminal whose location is registered, the process proceeds to step S14, and the femtocell control unit 120 controls the radio unit (transmission unit) 110 to transmit a warning message to the group registration terminal (mobile station) whose location is registered. The warning message is for example, "Power supply malfunction. Power supply is switched to the inner battery. The battery life is 2 hours.". When the condition of step S13 is not satisfied, the femtocell control unit 120 controls the line connection unit (transmission unit) 140 to transmit a warning message to a predetermined cellular phone (mobile station) or the like registered at the registration unit 122, at step S15. In this case, the warning message is similar to the message describe above. In here, the "predetermined cellular phone (mobile station) or the like" to which the warning message is transmitted is preferably a terminal (mobile station) that is group-registered at the femtocell. Moreover, the mobile station or cellular phone received the warning message gives notice of the warning by a display of a message, display of dedicated icon, vibration, sound, blinking light or the like using a display unit, a vibration unit, a speaker, a light emitting unit or the like mounted on the cellular phone (mobile station).

The femtocell FCL recognizes accurately which mobile station is location-registered, in other words, whether there is a mobile station or not within the cell. Therefore, as described above, it is possible to determine rapidly and accurately whether there is a mobile station to which a warning message should be transmitted by the determination of the step S13. When there is no mobile station to which a warning message should be transmitted, step S14 is not performed, so that there is no waste of power when the femtocell is powered by the battery. For example, in case of a cordless telephone, when a child telephone is located where radio waves from a parent telephone cannot reach, and if the parent telephone is controlled to output a signal including a warning message until there is a response, radio waves are continuously outputted. Thus, the battery power is wastefully consumed, so that the battery runtime in the parent telephone is reduced. Moreover, when the parent telephone is controlled to transmit a signal including a warning message once, there is a fear that the child telephone cannot receive the signal. On the other hand, since the femtocell according to this embodiment recognizes accurately the status of mobile station in the cell by location registration, the wasteful cases described above do not occur by the determination of the step S13. In other words, in this embodiment, when there is a registered mobile station within an area covered by the femtocell, the radio unit 110 is used as a transmission unit for transmitting a warning message, otherwise the line connection unit 140 is used as a transmission unit for transmitting a warning message, so that there is no waste of the power.

After the warning message is transmitted at step S14 or S15, since the power control unit 150 switches a power supply to the battery 160 from the commercial power source, the femtocell control unit 120 sets the femtocell to a power saving mode. For example, the femtocell control unit 120 controls radio waves outputted through the radio unit 110 and the antenna ANT to be weaken during the power saving mode. Regarding an operation of the radio unit during the power saving mode, a transmission unit (not shown) of the radio unit may be disabled and only a reception unit (not shown) may operate. Otherwise, the radio unit may operate intermittently. Moreover, all functions of the radio unit may be first stopped, and only several functions (for example, transmission unit or reception unit) may be intermittently operated. And, during a power saving mode, the power control unit 150 may check the voltage of the battery 160, calculate "a residual battery runtime" when the power of the battery 160 is used, and transmit a message indicating the residual battery runtime, for example, a message of "the residual battery runtime is 40 minutes" by periods (for example, every 30 minutes) to a group registration terminal (mobile station) whose location is registered, or to a cellular phone (mobile station) or the like registered at the registration unit when there is no group registration terminal whose location is registered.

By controlling the femtocell with the method described above, a user can recognize that power supply to the femtocell is suddenly stopped from the cellular phone (mobile station). For example, when a breaker of an outlet for the femtocell is suddenly pulled down during a call, a user can call continuously without being broken. Moreover, since a user can recognize that the femtocell is powered by a battery, it can be expected for a user to raise the breaker, and therefore, it is possible to prevent the telephone conversation from being suddenly broken since the femtocell is powered by the battery and uses up the battery power contrary to user's intention. And, the cellular phone does not perform handoff to the public base station due to power-off of the femtocell contrary to user's intention. A user can know a power failure of the femtocell even when he is out of service area of the femtocell. Moreover, the femtocell can operate for long time by entering power saving mode. When receiving a message out of service area of the femtocell, a user can supply power to the femtocell when he comes back home, so that the cellular phone does not communicate through a general base station contrary to user's intention.

While the invention has been described with reference to exemplary embodiments and drawings, it will be understood by those skilled in the art that many various modifications and extensions may be implemented using the teaching of this invention. All such modifications and extensions are intended to be included within the true spirit and scope of the present invention. For example, each unit, function included in each step and the like can be rearranged not to be contradictory logically. And, a plurality of units, steps and the like can be combined or divided. For example, in the embodiment of FIG. 3, either one process of step S14 and step S15 is performed according to the determination result of step S13, but both processes of steps S14, S15 may be performed by omitting the determination of step S13. And, a contact list registered at the registration unit as a destination to which a message is transmitted may be a mail address, telephone number, communication information such as IP address or the like as well as information for identifying an apparatus such as a mobile station or the like. Therefore, in these cases, an apparatus registered at the registration unit may not be a mobile station using the femtocell.

The invention claimed is:

1. A base station powered by a commercial power source comprising:

a registration unit configured to register destinations to which one or more messages are transmitted;

a battery configured to supply power to the base station;

a radio unit configured to communicate with at least one mobile station;

a line connection unit configured to connect a broadband line;

a power control unit configured to switch a power supply for the base station from the commercial power source to the battery; and a transmission unit configured to, when the power supply for the base station is switched from the commercial power source to the battery by the power control unit, transmit a message, about switching the power supply, to a mobile station through the radio unit if the location of the mobile station associated with the destination to which the message is transmitted is registered at the base station, and transmit a message, about switching the power supply, to a mobile station through the line connection unit if the location of the mobile station associated with the destination to which the message is transmitted is not registered at the base station.

2. The base station according to claim 1, further comprising a control unit for setting a power saving mode when the power supply for the base station is switched from the commercial power source to the battery by the power control unit.

3. A method of powering a base station using a commercial power source, comprising:

registering destinations to which one or more messages are transmitted;

supplying power to the base station using a battery;
communicating, by the base station, with at least one mobile station via radio communication or a broadband line;
switching a power supply for the base station from the commercial power source to the battery; and
when the power supply for the base station is switched from the commercial power source to the battery, transmitting a message, about switching the power supply, to a mobile station through radio communication if the location of the mobile station associated with the destination to which the message is transmitted is registered at the base station, and transmitting a message, about switching the power supply, to a mobile station through the broadband line if the location of the mobile station associated with the destination to which the message is transmitted is not registered at the base station.

4. The method according to claim 3, further comprising setting a power saving mode when the power supply for the base station is switched from the commercial power source to the battery.

* * * * *